United States Patent [19]
Swartzman

[11] 3,812,277
[45] May 21, 1974

[54] DEMONSTRATION TYPEWRITER KEYBOARD WALL CHART

[76] Inventor: Bernard A. Swartzman, State St., Lowville, N.Y. 13367

[22] Filed: Jan. 30, 1973

[21] Appl. No.: 328,004

[52] U.S. Cl. ............................................. 35/6
[51] Int. Cl. ........................................ G09b 13/02
[58] Field of Search ............................... 35/5, 6

[56] References Cited
UNITED STATES PATENTS

| | | | |
|---|---|---|---|
| 2,500,507 | 3/1950 | Avery et al. | 35/5 |
| 3,080,661 | 3/1963 | Conrath | 35/6 |
| 2,154,478 | 4/1939 | Smith | 35/5 |
| 1,984,599 | 12/1934 | Safar | 35/6 |
| 2,931,108 | 4/1960 | Brown | 35/5 |

Primary Examiner—Robert W. Michell
Assistant Examiner—J. H. Wolfe
Attorney, Agent, or Firm—Harvey B. Jacobson; Clarence A. O'Brien

[57] ABSTRACT

A demonstration typewriter keyboard wall chart system having a display of visible indicia representing keys of a typewriter keyboard, and lamps associated with the keys for selectively illuminating same. The lamps are actuated by switches operatively connected to the lamps. These switches are push-button switches in which the actuating stem has been provided with a hole. The shank of a tack having a substantially planar head is inserted in the stem hole to simulate a keyboard key. A plurality of circuits each including a lamp and switch are connected to the output of a step-down transformer so that low-voltage elements may be employed.

6 Claims, 6 Drawing Figures

3,812,277

DEMONSTRATION TYPEWRITER KEYBOARD WALL CHART

BACKGROUND OF THE INVENTION

1. Field of the Invention

This invention relates generally to an educational demonstration device, and particularly to a typewriter keyboard wall chart for demonstrating typewriter finger positions to students.

2. Description of the Prior Art

Educational aids are known that are intended for use in teaching typing to students. Among these aids are those disclosed in U.S. Pat. Nos. 2,154,478 and 2,500,507, in which specific indicia on a wall chart is only visible when illuminated by actuation of a corresponding key on a remote control module. These arrangements prohibit the student from seeing the selected keys in relation to the entire keyboard. Further, these known devices have the disadvantage of employing expensive control module constructions that virtually duplicate an actual typewriter system.

SUMMARY OF THE INVENTION

It is an object of the present invention to provide a demonstration typewriter keyboard wall chart system having all of the indicia of the wall chart visible at all times.

It is another object of the present invention to provide a control module for a keyboard educational aid that is of simple, reliable, and inexpensive construction.

It is yet another object of the present invention to provide a demonstration wall chart able to use low voltage electrical elements.

These and other objects are achieved according to the present invention by providing a demonstration typewriter keyboard wall chart system having: a display of visible indicia representing keys of a typewriter keyboard; a plurality of lamps, each lamp associated with an individual key on the display for individually illuminating that key; and a plurality of normally open-switches, each switch operatively connected to a lamp and associated therewith as a set for selectively actuating the lamp.

According to a preferred embodiment of a control module according to the present invention, each switch is formed by a push-button switch having an actuating stem provided with a hole. The shank of a tack is inserted into the hole so that the substantially planar head of the tack will be arranged to simulate a typewriter key. The simulation of an entire typewriter keyboard, representing all eighty-eight characters, is easily simulated by arranging a plurality of the switches in a suitable support.

A transformer, and the like, may be mounted on a framework supporting the wall chart to step-down the voltage supplied to the lamps and switches. The input of this transformer would be selectively connected to a source of electric power, and the output connected in series with each set of a lamp and associated switch.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
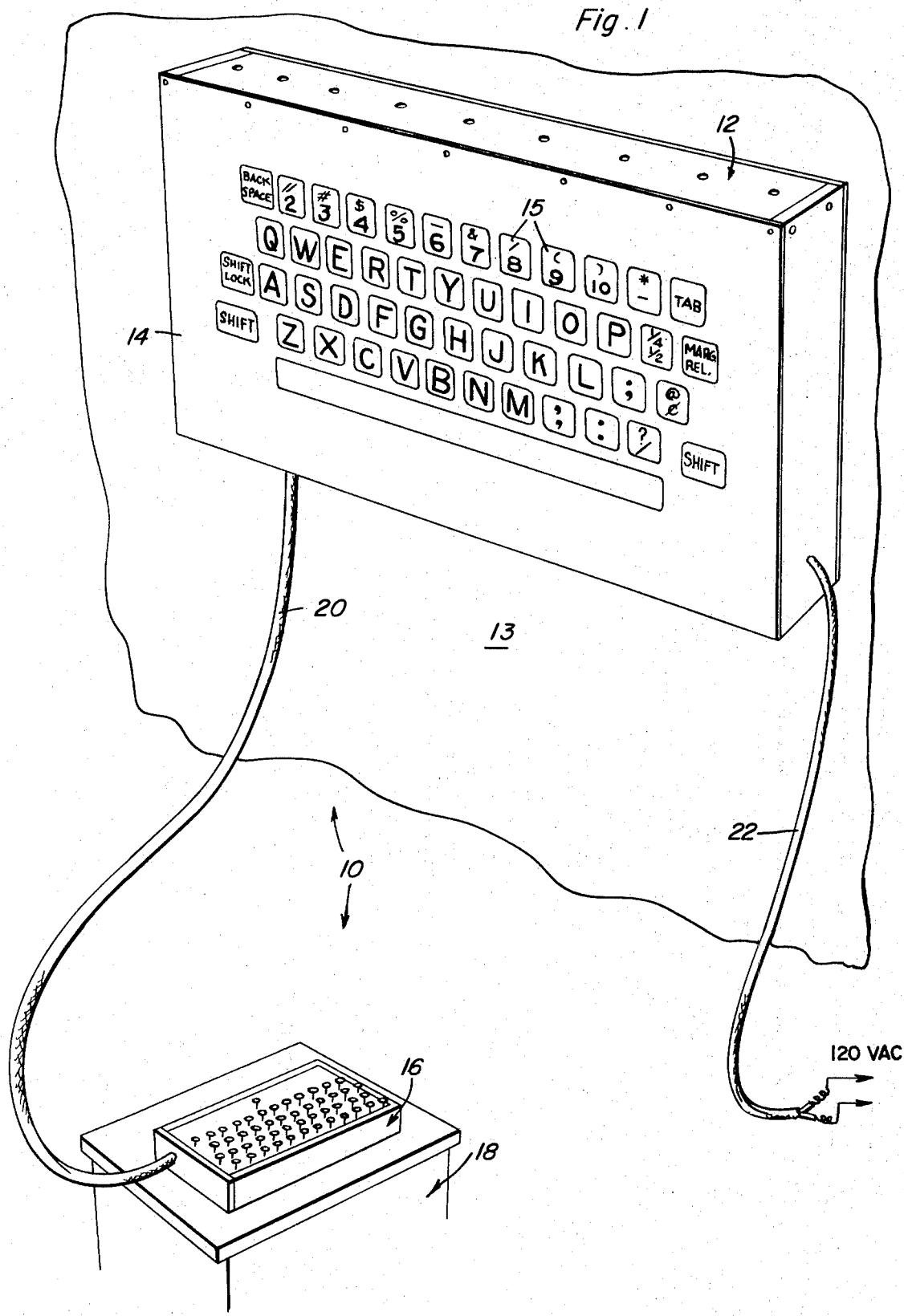
FIG. 1 is a fragmentary, perspective view showing a demonstration typewriter keyboard wall chart system according to the present invention.

FIG. 1 of the drawings shows a demonstration typewriter keyboard wall chart system 10 according to the present invention. This system 10 is formed by a wall chart module 12 which may be mounted on a wall 13 in a suitable, known manner (not shown), and which includes a planar member forming a wall chart 14. This wall chart 14 has a display of visible indicia 15 representing keys of a typewriter keyboard. It is to be understood that this indicia 15 is visible at all times. System 10 is further formed by a control module 16 which permits selective actuation of keys to be illuminated on chart 14. A suitable stand 18 may be provided for supporting module 16 at a convenient height for actuation. Preferably, module 16 and stand 18 are arranged at the front of a, for example, classroom adjacent chart 14 so that the person conducting the demonstration will be before a class of students, and the like. A cable 20 made of a plurality of individual wires connects module 16 to module 12, while a conventional power cord 22 connects module 12 to a conventional source of electricity.

Figure 2:
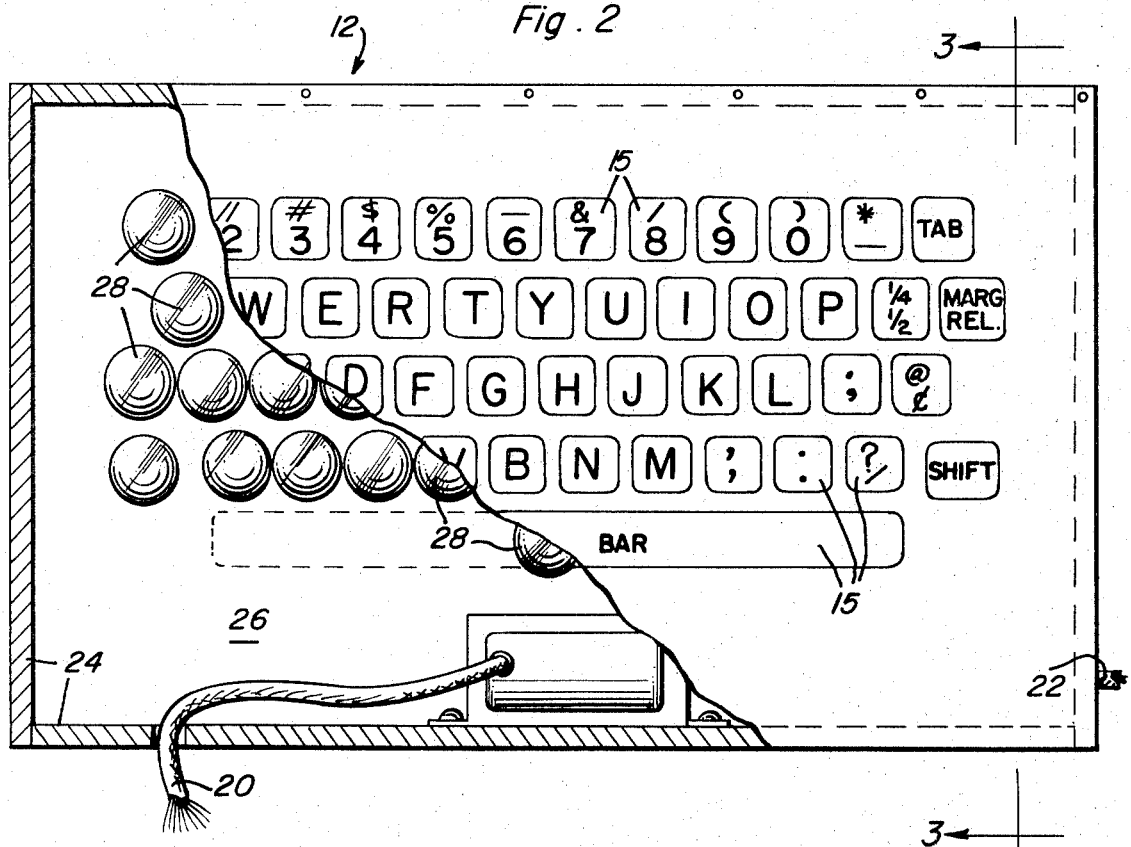
FIG. 2 is a side elevational view, partly cut away and in section, showing a wall chart module according to the present invention.
Figure 3:
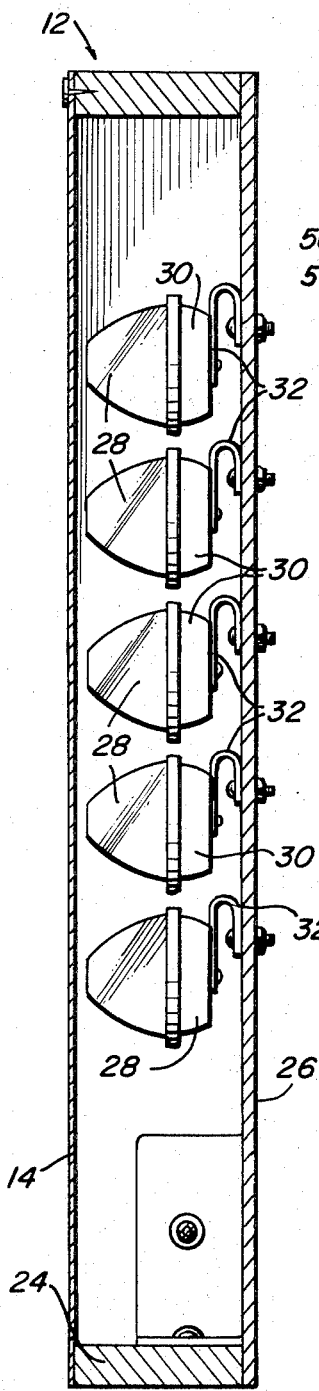
FIG. 3 is a sectional view taken generally along the line 3—3 of FIG. 2.

Referring now to FIGS. 2 and 3 of the drawings, module 12 has a substantially rectangular framework 24 provided with a pair of open faces. Wall chart 14, which is preferably constructed from a flexible and transparent material such as a cellulose acetate, covers one of the open faces so as to form the display. A panel 26 covers the other of the open faces. It is to be understood that although framework 24 and panel 26 are indicated in the drawing as constructed from a metal, other suitable material such as wood may be employed if desired.

A plurality of lamps 28, each lamp 28 associated with an individual key on the display formed by wall chart 14, are mounted on panel 26 as by conventional sockets 30 and suitable brackets 32. The function of these lamps is to individually illuminate a typewriter key represented by the indicia on wall chart 14. So as to better achieve this result, the lenses on lamps 28 may be constructed to give off a star of light or other similar pattern. An example of lamps 28 which have been found suitable for use in a module 12 are those sold by "Western Auto" designated C6305W.

Figure 4:
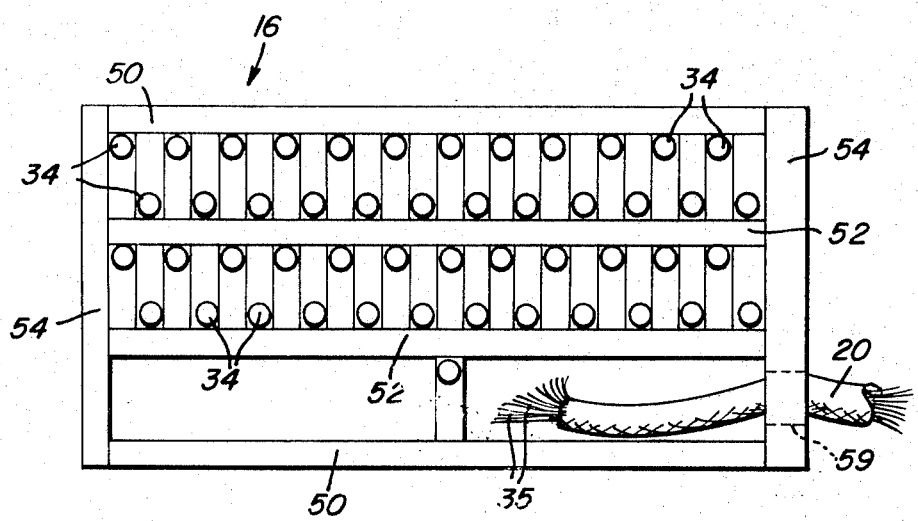
FIG. 4 is a fragmentary, schematic top plan view showing a control module according to the present invention.
Figure 5:
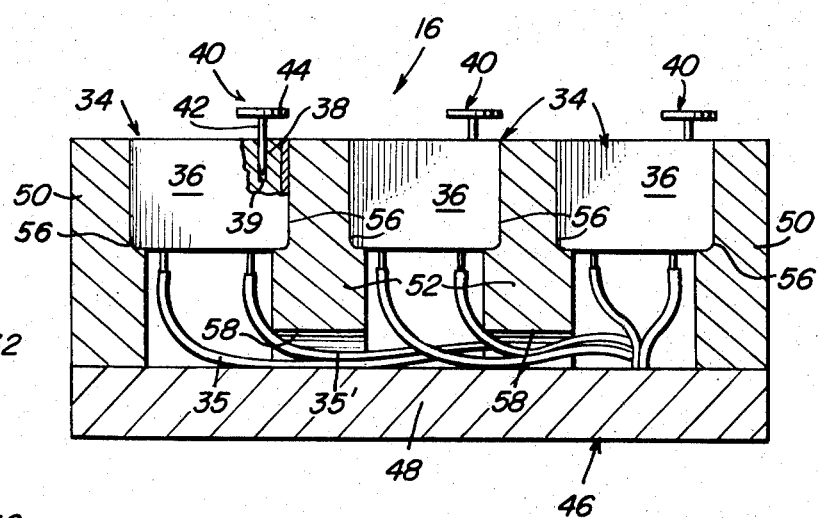
FIG. 5 is a vertical transverse sectional view showing a control module such as FIG. 4, but with only three rows of switches.

FIGS. 4 and 5 of the drawings show a preferred embodiment of control module 16. A simulated keyboard is formed in this module by a plurality of normally open switches 34, each switch 34 operatively connected to a lamp 28 and associated therewith as a set. This connection may be achieved as by wires 35 and 35'. Each switch 34 is formed by a push-button switch 36 similar to that manufactured by Cherry Electrical Products and marketed under the designation E-16-22A N.O., 2 amp. 125 volts. The actuating stem 38 of the switch 36 is provided with a hole 29 in a conventional manner, and a tack 40 is mounted on stem 38 by having its shank 42 inserted into hole 39. A substantially planar head 44 of tack 40 will then be arranged to simulate a typewriter key.

A housing 46 is provided for supporting switches 34. This housing 46 is formed from a rectangular, planar base 48 and a plurality of walls 50, 52, and 54 affixed to and extending co-directionally from base 48. The longitudinally extending side walls 50 and walls 52 intermediate the side walls are provided with recesses 56 forming steps to receive a portion of a switch 34 and retainingly space same from base 48. Cutouts 58 are provided in walls 52 for permitting wires 35 to be passed out of module 16. An opening 59 is provided in one of the end walls 54 for permitting cable 20 formed from wires 35 to exit housing 46.

Figure 6:
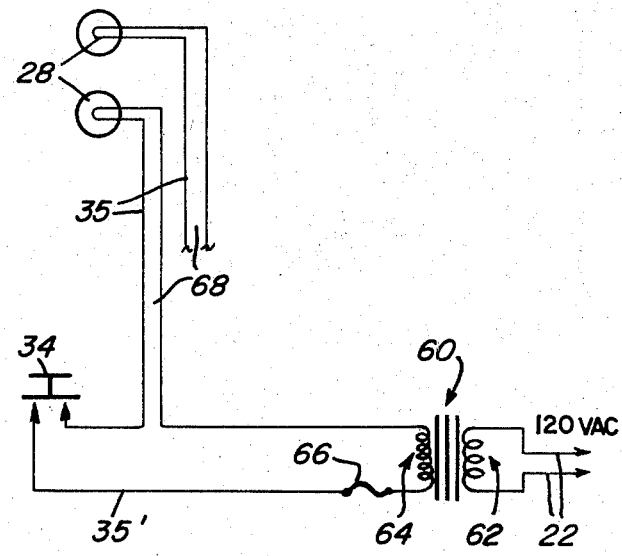
FIG. 6 is a schematic diagram showing an electrical circuit for a wall chart system according to the present invention.

FIG. 6 of the drawings shows one possible electrical circuit for a system 10 according to the present invention. In this circuit, a conventional step-down transformer 60 (FIG. 3) is mounted on framework 24, and has its input 62 connected to a conventional source of electric power, such as a standard 120 volt A.C. domestic electrical outlet. The output of transformer 60 is connected to each set of a switch 34 and lamp 28. A conventional fuse 66 or circuit breaker (not shown) may be inserted in a common wire. This means that only one circuit breaker or fuse in the common wire from the output of the transformer will afford all the protection necessary for all circuits needed. As can be readily understood from FIG. 6, the lamp and switch are in series in an output circuit, and closing of the switch 34 will actuate the associated lamp 28.

A wall chart system 10 according to the present invention is intended to be used throughout, for example, a complete beginning course in typing. The lamps 28 behind chart 14 are mainly used to introduce the keys and their reaches at the beginning of the class, but the attractive wall chart may be used for reference throughout the course. The students would not normally operate the system, but they could do so if desired on an individual basis.

Advantages of a wall chart system 10 according to the present invention include the ability of the teacher to watch the students as the teacher types out the key reaches, and to demonstrate the finger reaches while the students watch wall chart 14. The teacher needs to say very little, the lighted keys show the correct approach and save the teacher's voice. The teacher may push down and hold any desired number of keys at a time to show positioning of the typist's fingers. Examples: home row, anchor keys, and shift keys. A system 10 creates an exciting audi-visual aid for all educational levels. Further, it makes teaching and learning easier and more fun.

An additional advantage of the system 10 according to the present invention is that control module 15 uses standard production microswitches which afford significant cost savings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A demonstration typewriter keyboard wall chart system, comprising, in combination:
    a. a display of indicia clearly visible without illumination and representing keys of a typewriter keyboard;
    b. means for individually illuminating each of said keys, the illuminating means being a plurality of lamps, each lamp associated with an individual key on the display, each lamp including a lens which gives off a star of light highlighting the associated indicia representing a key, the clearly visible indicia and selected keys highlighted by illumination providing an easily readable display; and
    c. means for selectively actuating the illuminating means, the actuating means including a plurality of normally-open switches, a housing, each switch mounted on the housing in isolation from each other switch and operatively connected to a lamp and associated therewith as a set, each switch being formed by a push-button switch having an actuating stem, each such push-button switch being provided with a hole, and a tack having a shank inserted into the hole for retention thereby, the tack also having a substantially planar head arranged to simulate a typewriter key and arranged for actuating an associated lamp on being pushed.

2. A structure as defined in claim 1, wherein a substantially rectangular framework is provided with a pair of open faces, and a planar member is arranged covering one of the open faces for forming the display.

3. A structure as defined in claim 2, wherein the planar member is a flexible and transparent wall chart, and the indicia is arranged in five rows.

4. A structure as defined in claim 3, further including a panel covering the other of the open faces, and wherein the lamps are mounted on this panel.

5. A structure as defined in claim 4, further including a transformer mounted on the framework having an input selectively connectible to a source of electric power and an output connected in series with each set of a lamp and associated switch.

6. A structure as defined in claim 1, wherein the housing has a rectangular, planar base, and a plurality of walls affixed to and extending co-directionally from the base, and at least some of these walls provided with recesses forming steps to receive a portion of a switch and space same from the base, and cutouts for permitting the passage of wires.

* * * * *